No. 812,430. PATENTED FEB. 13, 1906.
F. LEINEN.
COLLAR FOR DRAFT ANIMALS.
APPLICATION FILED MAR. 16, 1904.
Fig. 1.
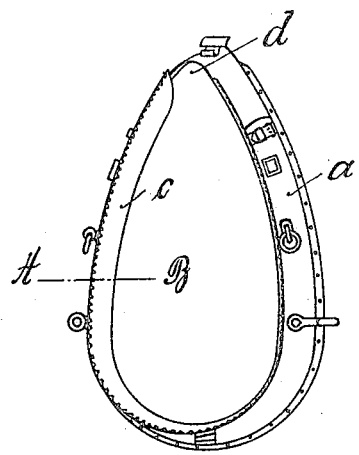
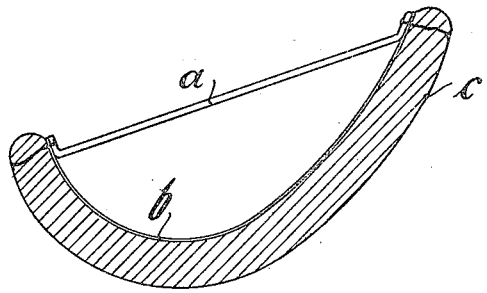
Fig. 2.
Witnesses:—
C. H. Leining
Gustav Hegde
Inventor:—
Franz Leinen
by Paul P. Paining
his attorney

UNITED STATES PATENT OFFICE.

FRANZ LEINEN, OF KÖNIGSTEIN, GERMANY.

COLLAR FOR DRAFT-ANIMALS.

No. 812,430. Specification of Letters Patent. Patented Feb. 13, 1906.

Application filed March 16, 1904. Serial No. 198 406.

*To all whom it may concern:*

Be it known that I, FRANZ LEINEN, a subject of the German Emperor, and a resident of Königstein, Saxony, German Empire, have invented certain new and useful Improvements in Collars for Draft-Animals; and I do hereby declare the following to be a full, clear, and exact description of the same, such as will enable others skilled in the art to which it appertains to make and use the same.

The present invention has reference to improvements in collars for horses, oxen, and other draft-animals; and the object of the invention is to provide a collar of resilient character which will considerably ease the shock upon the animal starting to pull and which will prevent galling of the animal.

In order to make the invention more readily understood, I have illustrated it on the accompanying sheet of drawings, of which—

Figure 1 represents a perspective elevation of my improved collar, and Fig. 2 a sectional view on line A B of Fig. 1.

The drawings show a one-piece collar; but my invention is equally applicable to two-part hinged or adjustable collars.

The collar-yoke is made in the shape of a hollow body composed of the outer wall $a$ and the inner wall $b$, preferably of sheet-steel; but any other suitable material may be used instead. A padding $c$ is provided on the wall $b$ to prevent the animal from being galled. The wall $a$ is flat, while the other, $b$, is vaulted, the former being provided with outturned flanges, through which and the wall $b$ and padding $c$ rivets or other suitable securing means pass to secure the parts together. The inner wall $b$ may be made in one or several parts, the latter especially in the case of an adjustable collar. In this latter case also the upper wall $a$ is preferably composed of several sections adjustably secured to one another. The inner wall, as well as the padding, should not be carried quite up to the point of the collar, but a recess $d$ left for receiving the mane for the purpose of preventing the collar from injuring the mane and galling the animal's neck.

What I claim is—

A horse-collar composed of two sheet-metal members, one of said members being vaulted, the other thereof being flat, outturned flanges formed on said flat member, a padding adjacent said vaulted member and of less length than said members, and securing means passing through said flanges, vaulted member and padding.

In testimony that I claim the foregoing as my invention I have signed my name in presence of two subscribing witnesses.

FRANZ LEINEN.

Witnesses:
   CHAS. L. COLE,
   PAUL ARRAS.